US008014803B2

(12) United States Patent
Harada et al.

(10) Patent No.: US 8,014,803 B2
(45) Date of Patent: Sep. 6, 2011

(54) MOBILE COMMUNICATION SYSTEM, MOBILE STATION, BASE STATION, AND CONTROL CHANNEL ALLOCATION METHOD

(75) Inventors: Atsushi Harada, Kawasaki (JP);
Sadayuki Abeta, Yokohama (JP);
Takehiro Nakamura, Yokohama (JP)

(73) Assignee: NTT DoCoMo, Inc, Tokyo (JP)

( * ) Notice: Subject to any disclaimer, the term of this patent is extended or adjusted under 35 U.S.C. 154(b) by 654 days.

(21) Appl. No.: 12/092,927

(22) PCT Filed: Nov. 10, 2006

(86) PCT No.: PCT/JP2006/322445
§ 371 (c)(1),
(2), (4) Date: May 7, 2008

(87) PCT Pub. No.: WO2007/055310
PCT Pub. Date: May 18, 2007

(65) Prior Publication Data
US 2009/0262655 A1 Oct. 22, 2009

(30) Foreign Application Priority Data
Nov. 11, 2005 (JP) .................................. 2005-327819

(51) Int. Cl.
*H04B 7/00* (2006.01)
(52) U.S. Cl. .......................... 455/509; 370/252; 370/329
(58) Field of Classification Search .................. 455/509; 370/252
See application file for complete search history.

(56) References Cited

U.S. PATENT DOCUMENTS

| 5,577,046 | A | * | 11/1996 | Diachina et al. | 370/252 |
| 5,734,645 | A | * | 3/1998 | Raith et al. | 370/329 |
| 6,009,093 | A | * | 12/1999 | Choe | 370/376 |
| 6,359,877 | B1 | * | 3/2002 | Rathonyi et al. | 370/349 |
| 6,389,066 | B1 | * | 5/2002 | Ejzak | 375/224 |
| 6,405,039 | B1 | * | 6/2002 | Koorapaty et al. | 455/434 |
| 6,882,660 | B2 | * | 4/2005 | Lee et al. | 370/469 |
| 7,197,307 | B2 | * | 3/2007 | Kirla | 455/436 |
| 7,418,273 | B2 | * | 8/2008 | Tomoe et al. | 455/561 |

(Continued)

FOREIGN PATENT DOCUMENTS
JP 2006-352382 A 12/2006
(Continued)

OTHER PUBLICATIONS

International Search Report with English Translation from PCT/JP2006/322445 mailed Feb. 20, 2007 (3 pages).

(Continued)

*Primary Examiner* — Yuwen Pan
*Assistant Examiner* — Hai Nguyen
(74) *Attorney, Agent, or Firm* — Osha • Liang LLP (57) ABSTRACT

A disclosed mobile station includes a storage unit configured to establish a correspondence between an identifier for a downlink Layer-1 control channel associated with a downlink data channel and a physical channel parameter for an uplink Layer-1 control channel and to store the identifier and the physical channel parameter; and a unit configured to determine the physical channel parameter based on the identifier and generate the uplink Layer-1 control channel. A disclosed base station includes a storage unit; a unit configured to measure reception quality based on a signal transmitted from the mobile station, select the physical channel parameter and generate the downlink Layer-1 control channel corresponding to the physical channel parameter; and a transmitting unit configured to transmit control information on the generated downlink Layer-1 control channel.

10 Claims, 7 Drawing Sheets

U.S. PATENT DOCUMENTS

| | | | | |
|---|---|---|---|---|
| 7,672,685 | B2* | 3/2010 | Itoh | 455/522 |
| 7,814,322 | B2* | 10/2010 | Gurevich et al. | 713/171 |
| 2002/0015401 | A1* | 2/2002 | Subramanian et al. | 370/347 |
| 2002/0028688 | A1* | 3/2002 | Lee et al. | 455/502 |
| 2003/0220119 | A1* | 11/2003 | Terry | 455/466 |
| 2004/0209638 | A1* | 10/2004 | Beckman et al. | 455/522 |
| 2006/0003757 | A1* | 1/2006 | Subramanian et al. | 455/418 |
| 2006/0215592 | A1* | 9/2006 | Tomoe et al. | 370/315 |
| 2006/0291403 | A1* | 12/2006 | Kahtava et al. | 370/252 |
| 2009/0323597 | A1* | 12/2009 | Harada et al. | 370/329 |

FOREIGN PATENT DOCUMENTS

| | | |
|---|---|---|
| WO | 2005/096522 A1 | 10/2005 |

OTHER PUBLICATIONS

Written Opinion from PCT/JP2006/322445 mailed Feb. 20, 2007 (3 pages).

3GPP TS 25.308 V6.3.0 (Dec. 2004); "3rd Generation Partnership Project; Technical Specification Group Radio Access Network; High Speed Downlink Packet Access (HSDPA); Overall Description; Stage 2 (Release 6)"; Dec. 2004 (28 pages).

TSG-RAN Meeting #26; "Proposed Study Item on Evolved UTRA and UTRAN"; Dec. 2004; RP-040461 (5 pages).

* cited by examiner

| CHANNEL NUMBER FOR DOWNLINK ASSOCIATED CONTROL CHANNEL | LAYER-1 CONTROL CHANNEL FOR TRANSMITTING ARQ FEEDBACK SIGNAL |
|---|---|
| | FREQUENCY BLOCK NUMBER |
| #1 | #1 |
| #2 | #2 |
| ... | ... |
| #i | #i |
| ... | ... |
| #N | #N |

MOBILE COMMUNICATION SYSTEM, MOBILE STATION, BASE STATION, AND CONTROL CHANNEL ALLOCATION METHOD

BACKGROUND OF THE INVENTION

1. Field of the Invention

The present invention relates to a mobile communication system, a mobile station, a base station, and a control channel allocating method.

2. Description of the Related Art

An example of an ARQ (Automatic Repeat Request) feedback channel includes a feedback channel used for HSDPA (High Speed Downlink Packet Access) (for example, Non-Patent Reference 1).

Under HSDPA, a base station can simultaneously transmit data to multiple mobile stations for each transmission time unit (TTI: Transmission Time Interval) by applying CDM (Code Division Multiplexing) to an HS-PDSCH (High Speed Physical Downlink Shared Channel). The HS-PDSCH is a physical channel for transmitting traffic data. Accordingly, the multiple mobile stations simultaneously transmit ACK/NACK information (ARQ feedback signal) to the base station on HS-DPCCHs (High Speed Dedicated Physical Control Channels) as a result of decoding data transmitted on the HS-PDSCH.

An HS-DPCCH is a dedicated physical channel, whose signals are spread with a mobile-station-specific spreading code (scrambling code) in order to identify ARQ feedback signals transmitted from multiple mobile stations. Accordingly, the base station need not re-allocate a physical channel parameter such as a spreading code (scrambling code) for transmitting an ARQ feedback signal for each TTI, while the HS-DPCCH is allocated to a mobile station. The base station also need not transmit information about the allocated physical channel to the mobile station, while the HS-DPCCH is allocated to a mobile station.

Figure 1:
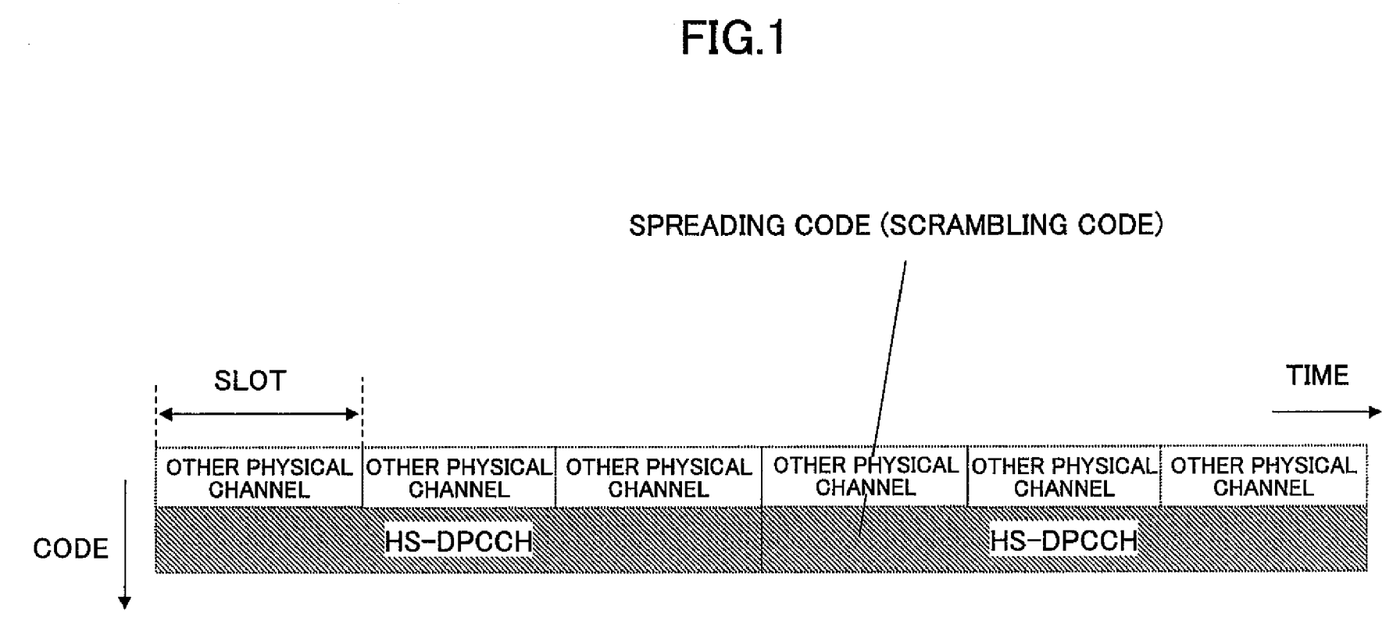
FIG. 1 shows an example of physical channel parameters for a Layer-1 control channel.

FIG. 1 shows an example of the HS-DPCCH, which is a physical channel for transmitting ARQ feedback signals in HSDPA. On the HS-DPCCH, a set of control information is transmitted using three time slots. The HS-DPCCH is code-multiplexed with the other physical channels for transmitting uplink signals on data channels or the like. The signal sequence after code-multiplexing is spread with a user-specific spreading code (scrambling code) and then transmitted to the base station.

[Non-Patent Reference 1] 3GPP TS 25.308
[Non-Patent Reference 2] 3GPP TSG-RAN#26 RP-040461

SUMMARY OF THE INVENTION

Problem(s) to be Solved by the Invention

However, the aforementioned related art presents the following problems.

Evolved UTRAN is a system designed for packet transmission. Under Evolved UTRAN, it is expected that signals will be mainly transmitted on a shared channel, rather than a dedicated channel (for example, Non-Patent Reference 2).

Under Evolved UTRAN, it is also expected that a channel band for data channels or control channels will be divided in the frequency domain and physical channels corresponding to the divided frequency bands will be allocated to different mobile stations. This allocation is referred to as FDM (Frequency Division Multiplexing).

It is also expected that channels will be allocated in consideration of channel fluctuations in the frequency domain when the physical channels are allocated to the divided frequency bands. This allocation is referred to as packet scheduling. Accordingly, the physical channel allocated to a certain mobile station dynamically varies over time.

It is also expected that FDMA (Frequency Division Multiple Access) will be employed to allocate uplink physical channels for transmitting ARQ feedback signals, in addition to CDMA (Code Division Multiple Access). For this reason, the use of the mobile-station-specific spreading code (scrambling code) is not sufficient to identify a physical channel for transmitting ARQ feedback signals.

Figure 2:
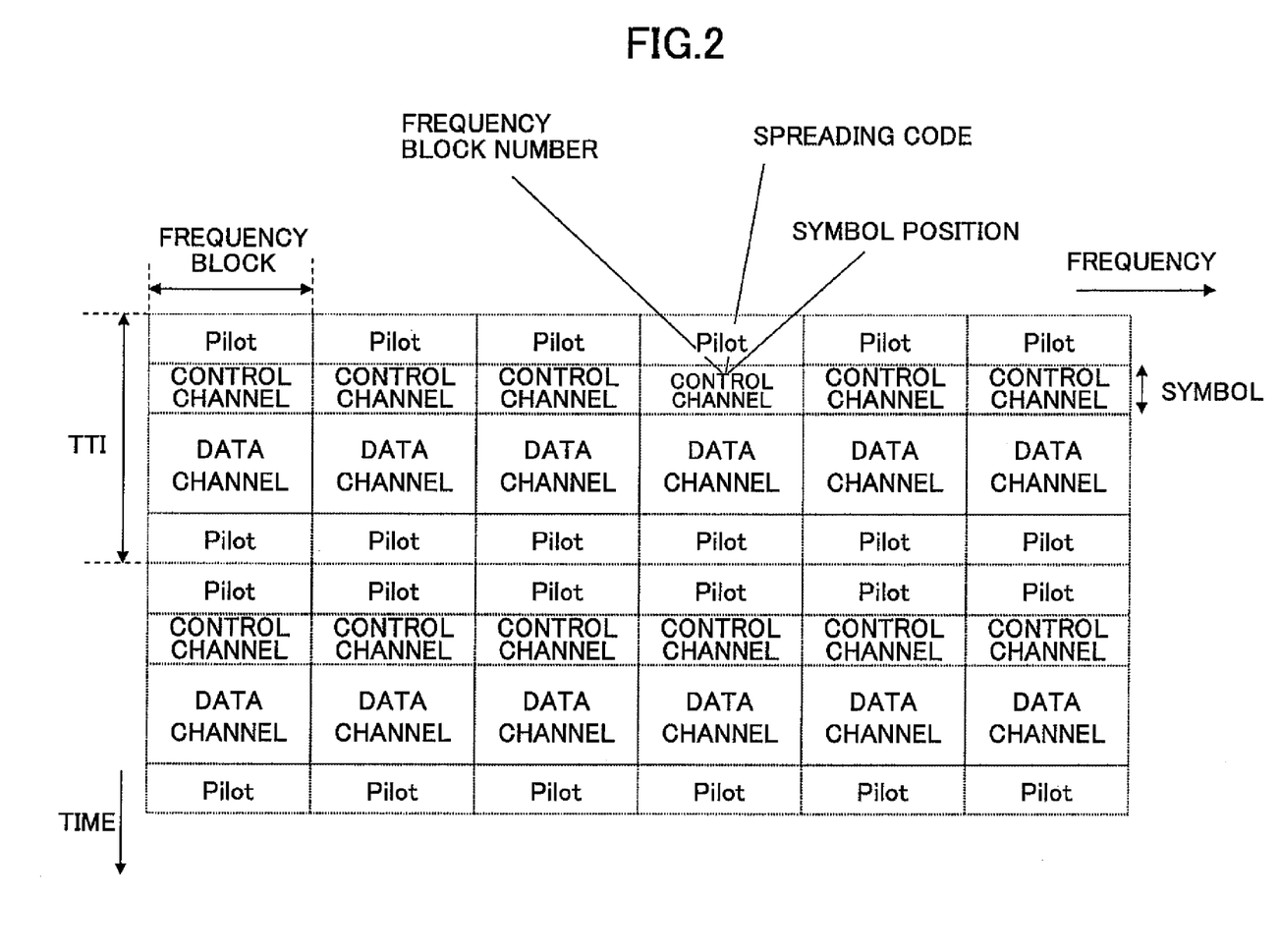
FIG. 2 shows an example of physical channel parameters for a Layer-1 control channel.

Specifically, as shown in FIG. 2, a physical channel is uniquely identified by a set of physical channel parameters such as a symbol position for allocating the physical channel and a spreading code identifier, in addition to a frequency block number for identifying which frequency block among divided frequency blocks is used for transmitting the ARQ feedback signal. As is the case with data channel parameters, the physical channel parameters are determined for each TTI.

The base station (network side) for performing packet scheduling determines, for each TTI, physical channel mapping information for ARQ feedback signals to be transmitted from the respective mobile stations and transmits allocation information about the physical channel parameters. This causes a problem in that the amount of signals transmitted on a control channel (associated control channel) which is associated with (used along with) the data channel will be increased.

In addition, due to evolution in broadband signal transmission, temporal fluctuations of received signal power vary in each frequency block depending on effects of frequency selective fading. When the base station statically allocates physical channel parameters to a certain mobile station upon determining physical channel mapping information for ARQ feedback signals to be transmitted from the respective mobile stations, the physical channel is not always suited for the certain mobile station to transmit the ARQ feedback signal.

In view of the aforementioned problems in the related art, it is a general object of the present invention to provide a mobile communication system, a mobile station, a base station, and a control channel allocating method, where the base station can transmit physical channel parameters such as a frequency block for allocating an ARQ feedback signal to the mobile station so that the mobile station can select an uplink physical channel with suitable propagation conditions, without increasing the amount of signals transmitted on an associated control channel.

Means for Solving the Problem

In one embodiment of the present invention, there is provided a mobile communication system including a mobile station and a base station, wherein:

the mobile station includes a storage unit configured to establish a correspondence between an identifier for a downlink Layer-1 control channel associated with a downlink data channel and a physical channel parameter for an uplink Layer-1 control channel and to store the identifier and the physical channel parameter;

a physical layer parameter determining unit configured to determine the physical channel parameter for the uplink Layer-1 control channel based on the identifier;

an uplink Layer-1 control channel generating unit configured to generate the uplink Layer-1 control channel used for transmitting a result of decoding data on the data channel based on the determined physical channel parameter; and a transmitting unit configured to transmit control information on the generated uplink Layer-1 control channel; and the base station includes a storage unit configured to establish a correspondence between the identifier for the downlink Layer-1 control channel associated with the downlink data channel and the physical channel parameter for the uplink Layer-1 control channel and to store the identifier and the physical channel parameter;

a reception quality measuring unit configured to measure reception quality on an uplink propagation path based on a signal transmitted from the mobile station;

a downlink Layer-1 control channel generating unit configured to select the physical channel parameter for the uplink Layer-1 control channel based on the reception quality on the uplink propagation path and generate the downlink Layer-1 control channel associated with the downlink data channel corresponding to the physical channel parameter; and a transmitting unit configured to transmit control information on the generated downlink Layer-1 control channel.

According to one embodiment of the present invention, the base station can transmit physical channel parameters such as a frequency block for allocating an ARQ feedback signal to the mobile station so that the mobile station can select an uplink physical channel with suitable propagation conditions, without increasing the amount of signals transmitted on an associated control channel.

In one embodiment of the present invention, there is provided a mobile station including:

a storage unit configured to establish a correspondence between an identifier for a downlink Layer-1 control channel associated with a downlink data channel and a physical channel parameter for an uplink Layer-1 control channel and to store the identifier and the physical channel parameter;

a physical layer parameter determining unit configured to determine the physical channel parameter for the uplink Layer-1 control channel based on the identifier;

an uplink Layer-1 control channel generating unit configured to generate the uplink Layer-1 control channel used for transmitting a result of decoding data on the data channel based on the determined physical channel parameter; and a transmitting unit configured to transmit control information on the generated uplink Layer-1 control channel.

According to one embodiment of the present invention, the mobile station can select an uplink physical channel with suitable propagation conditions based on physical channel parameters such as a frequency block for allocating an ARQ feedback signal.

In one embodiment of the present invention, there is provided a base station including:

a storage unit configured to establish a correspondence between an identifier for a downlink Layer-1 control channel associated with a downlink data channel and a physical channel parameter for an uplink Layer-1 control channel and to store the identifier and the physical channel parameter;

a reception quality measuring unit configured to measure reception quality on an uplink propagation path based on a signal transmitted from a mobile station;

a downlink Layer-1 control channel generating unit configured to select the physical channel parameter for the uplink Layer-1 control channel based on the reception quality on the uplink propagation path and generate the downlink Layer-1 control channel associated with the downlink data channel corresponding to the physical channel parameter; and a transmitting unit configured to transmit control information on the generated downlink Layer-1 control channel.

According to one embodiment of the present invention, the base station can transmit physical channel parameters such as a frequency block for allocating an ARQ feedback signal to the mobile station (receiving side) so that the mobile station can select an uplink physical channel with suitable propagation conditions, without increasing the amount of signals transmitted on an associated control channel.

In one embodiment of the present invention, there is provided a control channel allocating method, comprising the steps of:

a) measuring, by a base station, reception quality on an uplink propagation path based on a signal transmitted from a mobile station;

b) selecting, by the base station, a physical channel parameter for an uplink Layer-1 control channel based on the reception quality on the uplink propagation path and generating a downlink Layer-1 control channel associated with a downlink data channel corresponding to the physical channel parameter;

c) transmitting by the base station, control information on the generated downlink Layer-1 control channel;

d) receiving, by the mobile station, the control information on the downlink Layer-1 control channel associated with the downlink data channel;

e) determining, by the mobile station, the physical channel parameter for the uplink Layer-1 control channel corresponding to an identifier for the downlink Layer-1 control channel associated with the downlink data channel based on a predetermined correspondence between the identifier and the physical channel parameter;

f) generating, by the mobile station, the uplink Layer-1 control channel used for transmitting a result of decoding data on the data channel based on the determined physical channel parameter; and g) transmitting, by the mobile station, control information on the generated uplink Layer-1 control channel.

According to one embodiment of the present invention, the base station can transmit physical channel parameters such as a frequency block for allocating an ARQ feedback signal to the mobile station so that the mobile station can select an uplink physical channel with suitable propagation conditions, without increasing the amount of signals transmitted on an associated control channel.

Effect of the Invention

According to an embodiment of the present invention, a mobile communication system, a mobile station, a base station, and a control channel allocating method can be achieved, where the base station can transmit physical channel parameters such as a frequency block for allocating an ARQ feedback signal to the mobile station so that the mobile station can select an uplink physical channel with suitable propagation conditions, without increasing the amount of signals transmitted on an associated control channel.

DESCRIPTION OF THE PREFERRED EMBODIMENTS

Description of Notations 100 base station
200 mobile station

BEST MODE OF CARRYING OUT THE INVENTION

With reference to the accompanying drawings, a description is given below with regard to preferred embodiments of the present invention.

Throughout figures for illustrating the embodiments, corresponding elements are referenced by the same reference numerals, and the repetitive descriptions are omitted.

Figure 3:
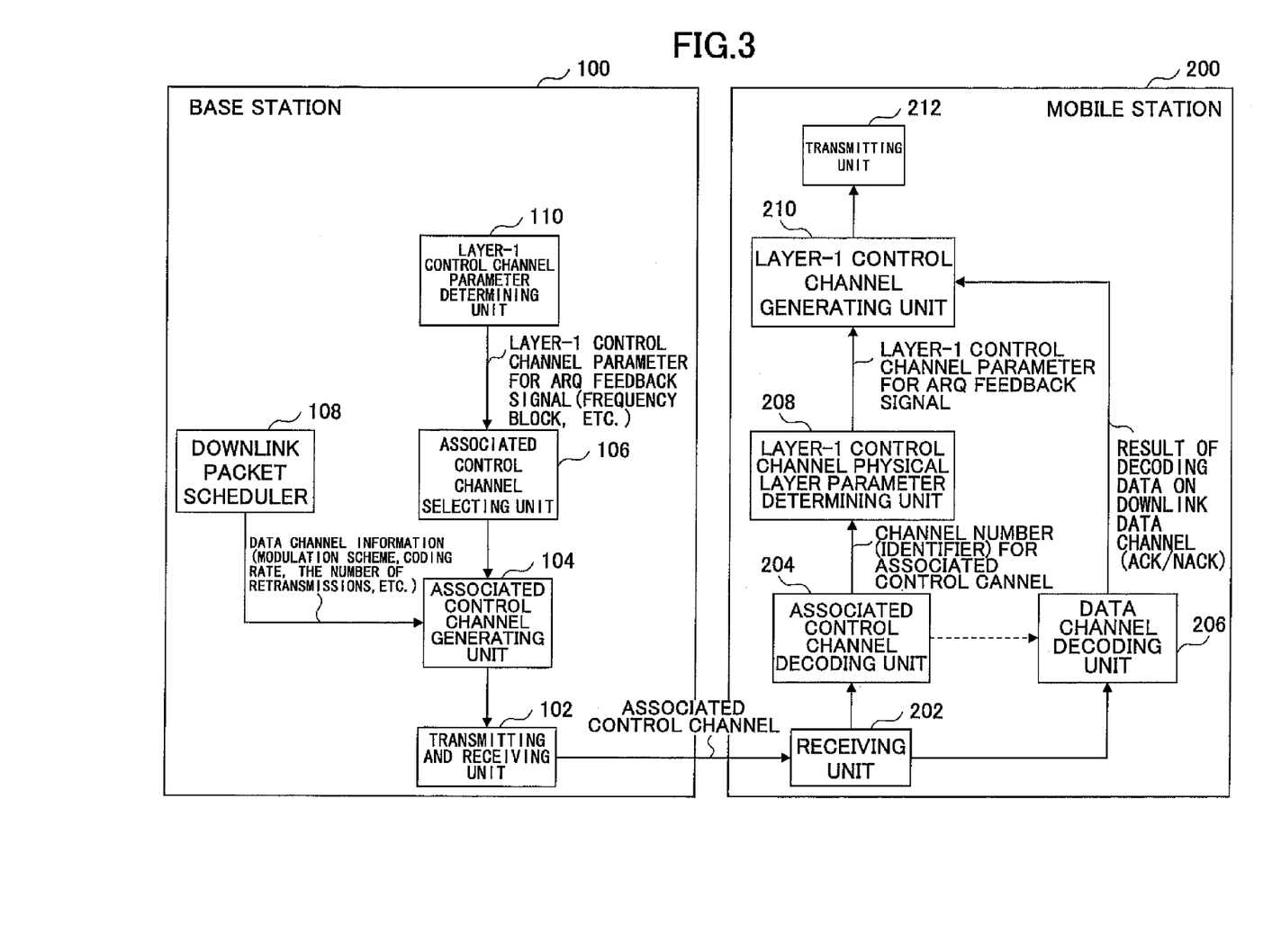
FIG. 3 shows a block diagram illustrating a mobile communication system in accordance with one embodiment of the present invention.

With reference to FIG. 3, a mobile communication system in accordance with an embodiment of the present invention is described below.

The mobile communication system in accordance with the present embodiment includes a base station 100 and a mobile station 200. The mobile communication system enables the base station 100 to allocate a Layer-1 (L1) control channel for an uplink ARQ feedback signal to the mobile station 200.

The base station 100 in accordance with the present embodiment is described below.

The base station 100 includes a transmitting and receiving unit 102, an associated control channel generating unit 104 (corresponding to a downlink Layer-1 control channel generating unit) connected to the transmitting and receiving unit 102, a downlink packet scheduler 108 connected to the associated control channel generating unit 104, an associated control channel selecting unit 106 (corresponding to a storage unit and the downlink Layer-1 control channel generating unit) connected to the associated control channel generating unit 104, and a Layer-1 control channel parameter determining unit 110 (corresponding to a reception quality measuring unit) connected to the associated control channel selecting unit 106.

The Layer-1 control channel parameter determining unit 110 measures quality (reception quality) on the uplink propagation path based on measurement of a signal transmitted from the mobile station 200. The Layer-1 control channel parameter determining unit 110 determines a physical layer parameter for an uplink Layer-1 control channel, which is allocated to each user in a certain TTI for transmitting an ARQ feedback signal. Then, the Layer-1 control channel parameter determining unit 110 provides information about the determined physical layer parameter to the associated control channel selecting unit 106. For example, the Layer-1 control channel parameter determining unit 110 determines a physical channel parameter for the uplink Layer-1 control channel (i.e. a Layer-1 control channel parameter for the ARQ feedback signal, for example, a frequency block) based on the reception quality on the uplink propagation path.

The associated control channel selecting unit 106 establishes a correspondence between an identifier for a downlink Layer-1 control channel associated with a downlink data channel and a physical channel parameter for the uplink Layer-1 control channel and stores the identifier and the physical channel parameter. The associated control channel selecting unit 106 selects an associated control channel for specifying allocation of a transmission opportunity (transmission time interval) based on the provided physical layer parameter and provides information about the associated control channel to the associated control channel generating unit 104. For example, the associated control channel selecting unit 106 generates the downlink Layer-1 control channel associated with the downlink data channel corresponding to the physical layer parameter.

For example, the associated control channel selecting unit 106 establishes a correspondence between a channel number for the downlink Layer-1 control channel associated with the downlink data channel and a frequency block number for the uplink Layer-1 control channel and stores the channel number and the frequency block number. The associated control channel selecting unit 106 selects the frequency block number for the uplink Layer-1 control channel based on the reception quality on the uplink propagation path. The associated control channel selecting unit 106 generates the downlink Layer-1 control channel associated with the downlink data channel corresponding to the frequency block number.

The downlink packet scheduler 108 allocates a transmission time interval to user data (i.e. downlink data channel). The downlink packet scheduler 108 also provides information about the data channel allocated to each user to the associated control channel generating unit 104. For example, the downlink packet scheduler 108 determines, as information about the data channel, a data modulation scheme, a channel coding rate, a physical layer parameter such as a frequency block, the number of retransmissions, and the like.

The associated control channel generating unit 104 maps the physical layer parameter provided from the downlink packet scheduler 108 to the selected associated control channel and provides the associated control channel to the transmitting and receiving unit 102.

The transmitting and receiving unit 102 transmits control information on the associated control channel to the mobile station 200. The transmitting and receiving unit 102 also receives the uplink Layer-1 control channel corresponding to the associated control channel. For example, the transmitting and receiving unit 102 waits for signals based on the physical channel parameter for the uplink Layer-1 control channel corresponding to the associated control channel.

The mobile station 200 in accordance with the present embodiment is described below.

The mobile station 200 includes a receiving unit 202, an associated control channel decoding unit 204 connected to the receiving unit 202, a data channel decoding unit 206 connected to the receiving unit 202, a Layer-1 control channel physical layer parameter determining unit 208 (corresponding to a storage unit and a physical layer parameter determining unit) connected to the associated control channel decoding unit 204, a Layer-1 control channel generating unit 210 (corresponding to an uplink Layer-1 control channel generating unit) connected to the Layer-1 control channel physical layer parameter determining unit 208 and the data channel decoding unit 206, and a transmitting unit 212 connected to the Layer-1 control channel generating unit 210.

The receiving unit 202 receives control information on the associated control channel from the base station 100, demodulates the control information, and provides it to the associated control channel decoding unit 204. The receiving unit 202 also receives data on the data channel from the base station 100, demodulates the data, and provides them to the data channel decoding unit 206.

The associated control channel decoding unit 204 decodes the control information on the associated control channel and provides an identifier for the associated control channel (for example, a channel number for the associated control channel) to the Layer-1 control channel physical layer parameter determining unit 208.

The Layer-1 control channel physical layer parameter determining unit 208 establishes a correspondence between an identifier for the downlink Layer-1 control channel associated with the downlink data channel and a physical channel parameter for the uplink Layer-1 control channel and stores the identifier and the physical channel parameter. The Layer-1 control channel physical layer parameter determining unit 208 determines the corresponding physical layer parameter for the ARQ feedback signal (i.e. the physical channel parameter for the uplink Layer-1 control channel to which the ARQ feedback signal is mapped) based on the provided identifier for the associated control channel.

For example, the Layer-1 control channel physical layer parameter determining unit 208 establishes a correspondence between a channel number for the downlink Layer-1 control channel associated with the downlink data channel and a frequency block number for the uplink Layer-1 control channel and stores the channel number and the frequency block number. The Layer-1 control channel physical layer parameter determining unit 208 determines the corresponding frequency block number for transmitting the ARQ feedback signal on the uplink Layer-1 control channel based on the channel number for the associated control channel and provides the channel number to the Layer-1 control channel generating unit 210.

The data channel decoding unit 206 decodes data on the data channel and provides the result of decoding data on the downlink data channel to the Layer-1 control channel generating unit 210. For example, the data channel decoding unit 206 provides ACK/NACK information as the result of decoding data on the downlink data channel to the Layer-1 control channel generating unit 210. The data channel decoding unit 206 also generates an ARQ feedback signal and provides it to the Layer-1 control channel generating unit 210.

The Layer-1 control channel generating unit 210 generates the uplink Layer-1 control channel for transmitting the ARQ feedback signal using the physical layer parameter for the uplink Layer-1 control channel provided by the Layer-1 control channel physical layer parameter determining unit 208 and provides the uplink Layer-1 control channel to the transmitting unit 212.

The transmitting unit 212 transmits the ARQ feedback signal on the uplink Layer-1 control channel to the base station.

Figure 4:
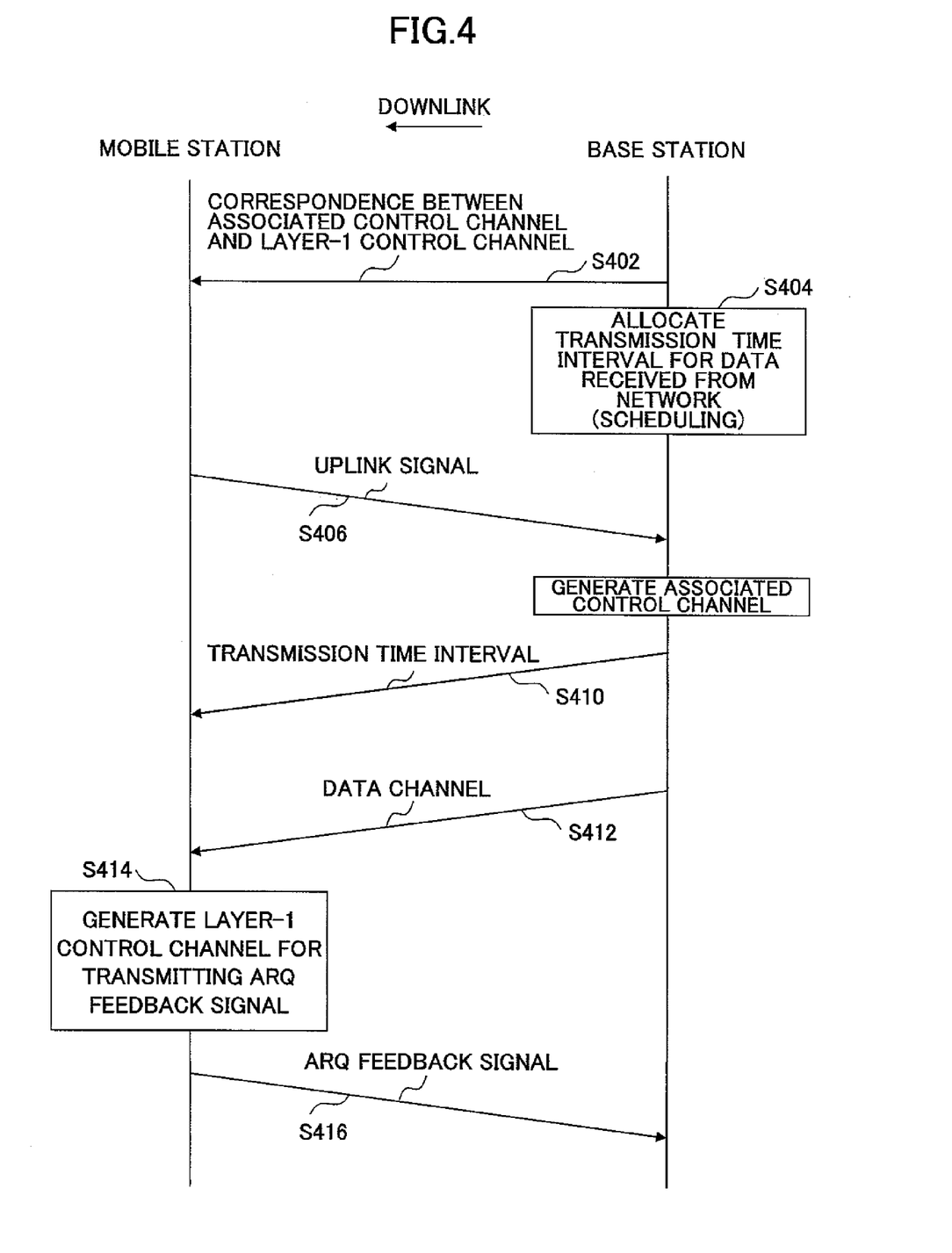
FIG. 4 shows a sequence diagram for allocating a Layer-1 control channel for transmitting an ARQ feedback signal.

With reference to FIG. 4, an example of allocating a Layer-1 control channel parameter for an ARQ feedback signal is described below.

The base station 100 and the mobile station 200 exchange a correspondence between an identifier for an associated control channel and a Layer-1 control channel parameter for an ARQ feedback signal before starting communications (Step S402). In this step, the network side (base station 100) may transmit the correspondence to the mobile station 200. Alternatively, both the base station 100 and the mobile station 200 may store the correspondence in advance. The correspondence between the identifier for the associated control channel and the Layer-1 control channel parameter for the ARQ feedback signal is stored in both the associated control channel selecting unit 106 within the base station 100 and the Layer-1 control channel physical layer parameter determining unit 208 within the mobile station 200.

When the transmission data are received by the base station 100 from the network side, the downlink packet scheduler 108 allocates a transmission time interval for the transmission data and provides data channel information to the associated control channel generating unit 104 (Step S404).

The mobile station 200 transmits an uplink signal (Step S406).

The base station 100 receives the uplink signal transmitted from the mobile station 200 and provides the uplink signal to the Layer-1 control channel parameter determining unit 110. The Layer-1 control channel parameter determining unit 110 measures reception quality of the uplink signal and determines a Layer-1 control channel parameter for an ARQ feedback signal based on the measurement result. The Layer-1 control channel parameter determining unit 110 provides information about the determined Layer-1 control channel parameter to the associated control channel selecting unit 106.

The associated control channel selecting unit 106 selects an associated control channel for specifying allocation of the transmission time interval based on the Layer-1 control channel parameter for the ARQ feedback signal and provides information about the associated control channel to the associated control channel generating unit 104. The associated control channel generating unit 104 generates the associated control channel and provides it to the transmitting and receiving unit 102 (Step S408). The transmitting and receiving unit 102 provides the transmission time interval on the associated control channel (Step S410).

Then, the transmitting and receiving unit 102 transmits data on a data channel (Step S412). The transmitting and receiving unit 102 within the base station 100 waits for signals based on the physical channel parameter for the uplink Layer-1 control channel corresponding to the associated control channel.

The receiving unit 202 within the mobile station 200 receives control information and data on the associated control channel and the data channel, respectively. The associated control channel decoding unit 204 decodes the control information on the associated control channel and provides an identifier for the associated control channel to the Layer-1 control channel physical layer parameter determining unit 208. The data channel decoding unit 206 decodes data on the data channel and provides the result of decoding data on the downlink data channel to the Layer-1 control channel generating unit 210. The Layer-1 control channel generating unit 210 generates the ARQ feedback signal as the result of decoding data on the data channel (Step S414). The transmitting unit 202 transmits the ARQ feedback signal to the base station 100 (Step S416).

In Step S404 of FIG. 4, the downlink packet scheduler 108 allocates the transmission time interval for the transmission data received from the network side. Then, reception quality is measured using the uplink signal transmitted in Step S406. However, the uplink signal is not always transmitted at this timing (Step S406). If the uplink signal is transmitted before allocating the transmission time interval for the transmission data received from the network side in Step S404, the Layer-1 control channel parameter determining unit 110 may measure reception quality of this uplink signal and determine the Layer-1 control channel parameter for the ARQ feedback signal based on the measurement result.

Figure 5:
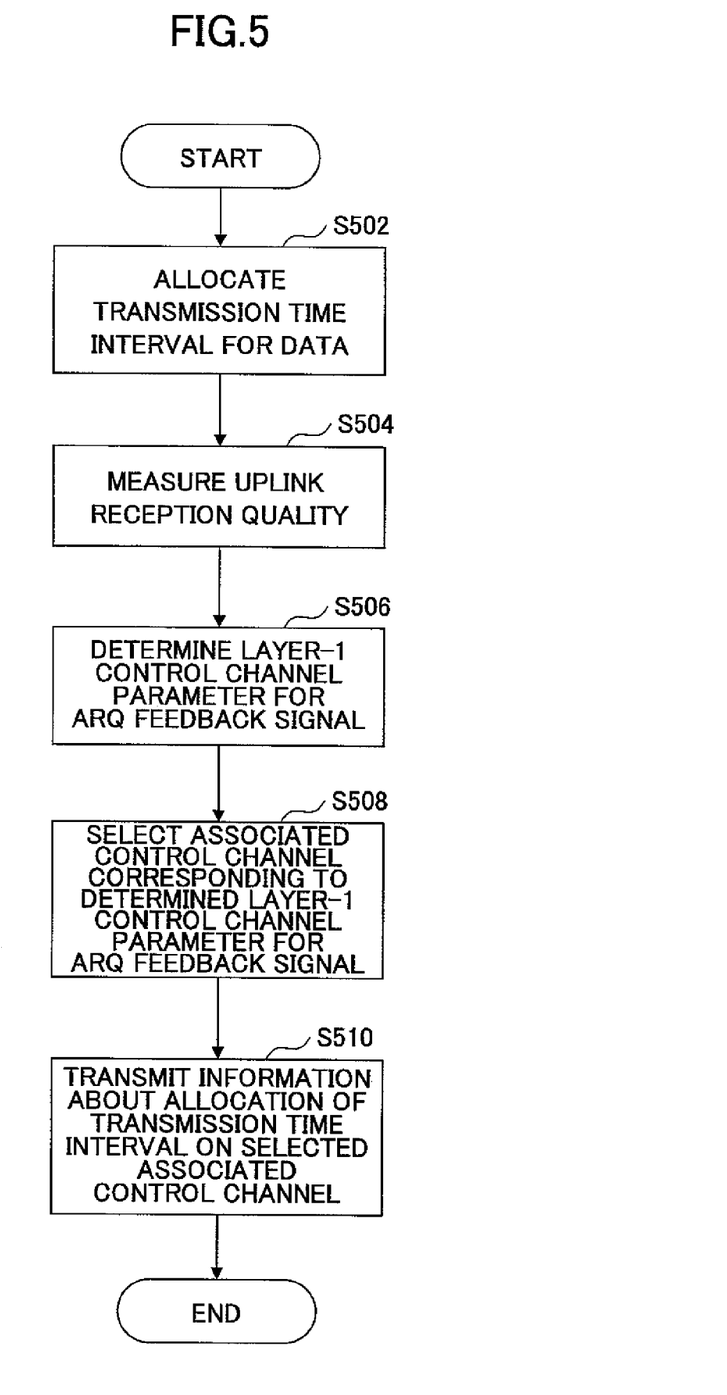
FIG. 5 shows a flowchart for generating an associated control channel.

With reference to FIG. 5, an example of generating an associated control channel is described below.

The downlink packet scheduler 108 allocates a transmission time interval for data and provides information about the transmission time interval to the associated control channel generating unit 104 (Step S502). Then, the Layer-1 control channel parameter determining unit 110 measures uplink reception quality using an uplink signal transmitted from the mobile station 200 (Step S504). The Layer-1 control channel parameter determining unit 110 determines a Layer-1 control channel parameter for an ARQ feedback signal suited for the mobile station 200 based on the measurement result and provides the Layer-1 control channel parameter to the associated control channel selecting unit 106 (Step S506). For example, the Layer-1 control channel parameter determining unit 110 determines the Layer-1 control channel parameter so that reception quality is above predetermined reception quality.

The associated control channel selecting unit 106 selects an associated control channel corresponding to the Layer-1 control channel parameter for the ARQ feedback signal and provides information about the associated control channel to the associated control channel generating unit 104 (Step S508). Then, the associated control channel generating unit 104 maps, to the associated control channel, information about the transmission time interval for data to be transmitted to the mobile station and transmits the information about the transmission time interval on the associated control channel (Step S510). Then, the transmitting and receiving unit 102 within the base station 100 waits for signals on the uplink Layer-1 control channel based on the physical channel parameter for the uplink Layer-1 control channel corresponding to the associated control channel.

In Step S502 of FIG. 5, the downlink packet scheduler 108 allocates the transmission time interval for the transmission data received from the network side. Then, reception quality is measured using the uplink signal transmitted in Step S504. However, the uplink signal is not always transmitted at this timing (Step S504). If the uplink signal is transmitted before allocating the transmission time interval for the transmission data received from the network side in Step S502, the Layer-1 control channel parameter determining unit 110 may measure reception quality of this uplink signal and determine the Layer-1 control channel parameter for the ARQ feedback signal based on the measurement result.

Figure 6:
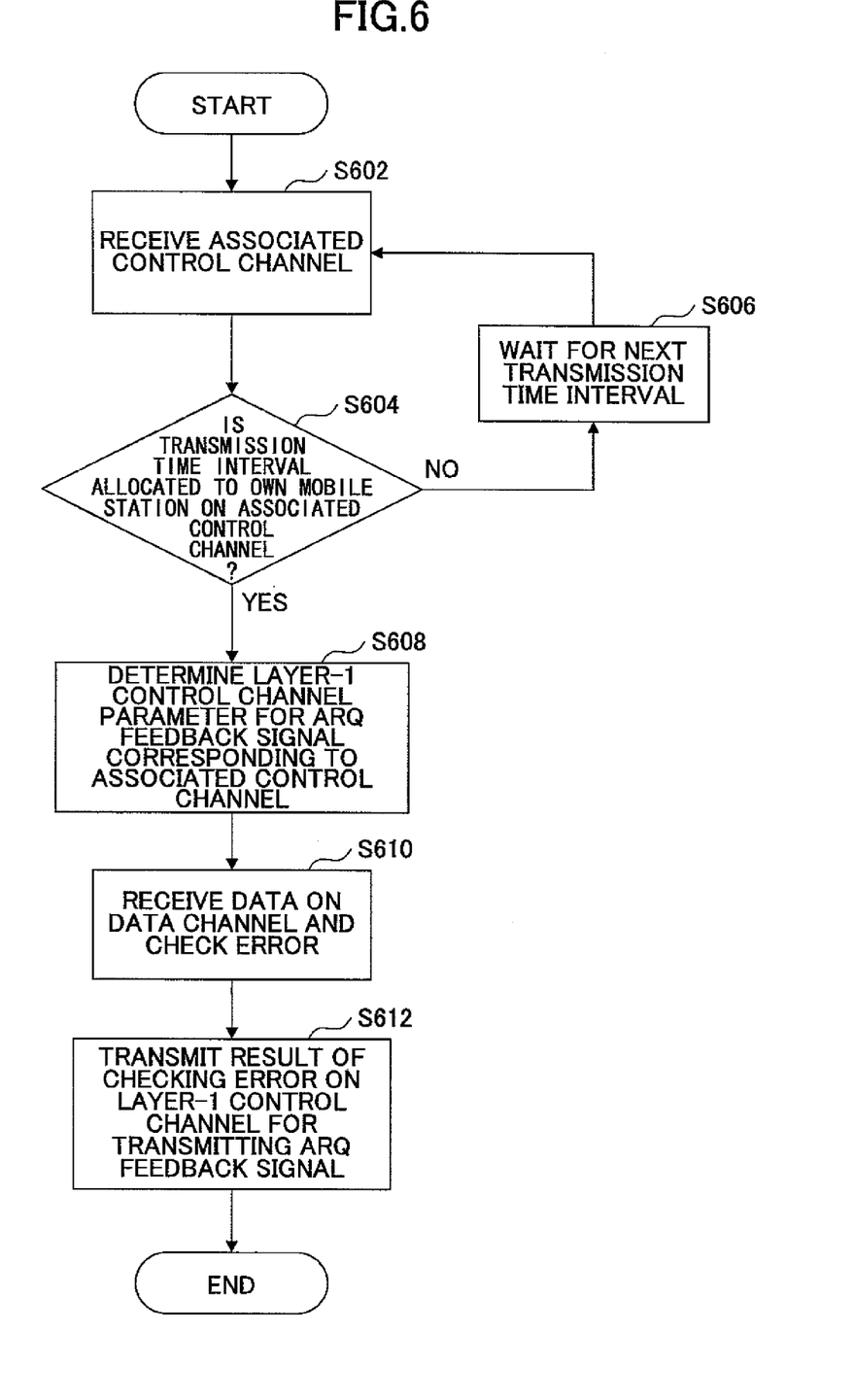
FIG. 6 shows a flowchart for generating a Layer-1 control channel for transmitting an ARQ feedback signal.

With reference to FIG. 6, an example of generating a Layer-1 control channel for transmitting an ARQ feedback signal is described below.

The receiving unit 202 within the mobile station 200 receives control information on an associated control channel (Step S602). The received control information is provided to the associated control channel decoding unit 204. The associated control channel decoding unit 204 decodes the control information on the associated control channel and checks whether a transmission time interval is allocated to the mobile station 200 (Step S604).

If the transmission time interval is not allocated to the mobile station 200 (Step S604: No), the mobile station waits for a next transmission time interval (Step S606). If the transmission time interval is allocated to the mobile station 200 (Step S604: Yes), the Layer-1 control channel physical layer parameter determining unit 208 determines a Layer-1 control channel parameter for an ARQ feedback signal based on a correspondence between the identifier for the associated control channel and the Layer-1 control channel parameter for the ARQ feedback signal (Step S608).

Figure 7:
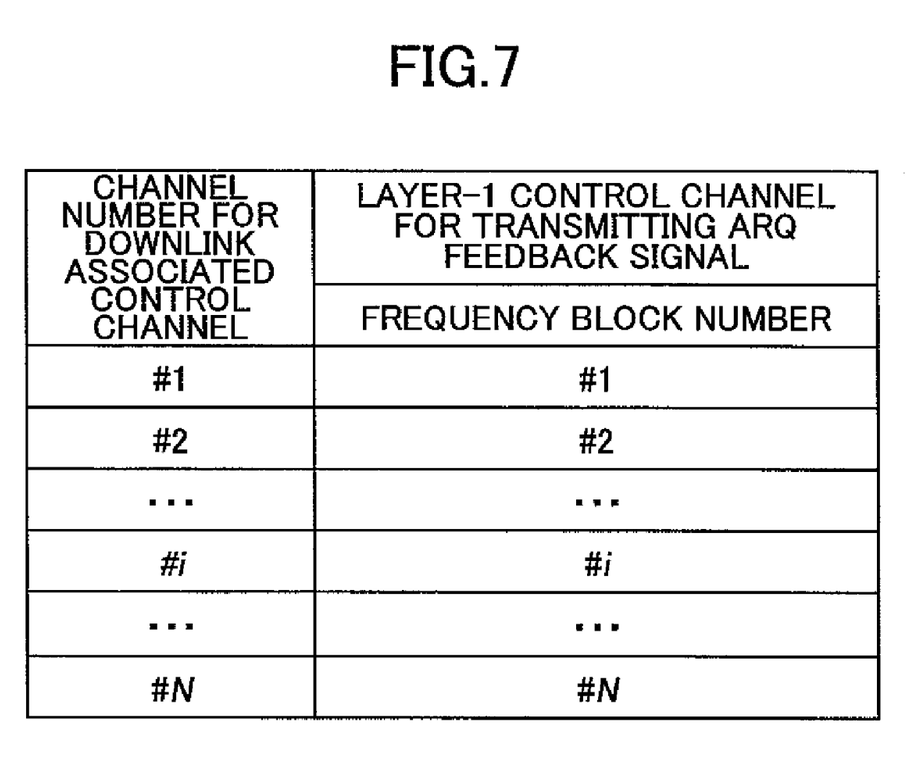
FIG. 7 shows an exemplary diagram illustrating allocation of a Layer-1 control channel for transmitting an ARQ feedback signal.

An example of the correspondence between the identifier for the associated control channel and the Layer-1 control channel parameter for the ARQ feedback signal is shown in FIG. 7. As shown in FIG. 7, each channel number for the downlink associated control channel is associated with a corresponding frequency block number for the Layer-1 control channel for transmitting the ARQ feedback signal. For example, the Layer-1 control channel physical layer parameter determining unit 208 determines the frequency block number for the Layer-1 control channel for transmitting the ARQ feedback signal based on the identifier (for example, channel number) for the associated control channel.

It is assumed herein that the Layer-1 control channel for transmitting the ARQ feedback signal is allocated a single symbol in a frame during a single transmission time interval (TTI) and that the Layer-1 control channel for transmitting the ARQ feedback signal is not code-multiplexed. However, the Layer-1 control channel for transmitting the ARQ feedback signal may be allocated multiple symbols in a frame during a single transmission time interval. In addition or alternatively, the Layer-1 control channel for transmitting the ARQ feedback signal may be code-multiplexed.

It is also assumed that the number (N) of selectable associated control channels is equal to the number (N) of physical layer parameters such as the number of frequency blocks which can be used for the Layer-1 control channel for transmitting the ARQ feedback signal. However, the number of selectable associated control channels may not be equal to the number of physical layer parameters such as the number of frequency blocks which can be used for the Layer-1 control channel for transmitting the ARQ feedback signal.

When the base station 100 allocates a transmission time interval by means of an identifier (for example, #i) for the associated control channel, the corresponding frequency block (#i) is determined as the Layer-1 control channel parameter for the ARQ feedback signal.

Then, the receiving unit 202 receives data on a data channel after receiving signals on the associated control channel, demodulates the received data on the data channel, and provides them to the data channel decoding unit 206. The data channel decoding unit 206 checks errors on the data channel (Step S610) and provides the result of decoding data to the Layer-1 control channel generating unit 210.

The Layer-1 control channel generating unit 210 generates the Layer-1 control channel for transmitting the ARQ feedback signal based on the result of checking errors on the data channel and transmits the result of checking errors via the transmitting unit 212.

According to this procedure, the base station can transmit the physical layer parameter selected from multiple Layer-1 control channels for transmitting the ARQ feedback signal so that the mobile station can select an uplink physical channel with suitable propagation conditions, without increasing the amount of downlink signals transmitted on the associated control channel.

Assuming that the number of the selectable Layer-1 control channels for transmitting the ARQ feedback signal is equal to N, signal information for each transmission time interval (TTI) can be reduced by $\log_2(N)$ bits for each single ARQ connection.

In the present embodiment, the frequency block number allocated to the Layer-1 control channel for transmitting the ARQ feedback signal is identical to the channel number for the associated control channel. However, the correspondence between the frequency block number and the channel number may be determined by means of a predetermined function which is known to both the base station and the mobile station.

Although ARQ is employed in the present embodiment, Hybrid ARQ may be employed in the present invention.

According to an embodiment of the present invention, the base station can transmit physical channel allocation information such as a frequency block for allocating an ARQ feedback signal to the mobile station so that the mobile station can select an uplink physical channel with suitable propagation conditions, without increasing the amount of signals transmitted on an associated control channel.

AVAILABILITY TO INDUSTRY

A mobile communication system, a mobile station, a base station, and a control channel allocating method are applicable to any mobile communication system.

This international patent application is based on Japanese Priority Application No. 2005-327819 filed on Nov. 11, 2005, the entire contents of which are hereby incorporated by reference.

What is claimed is:

1. A mobile communication system including a mobile station and a base station, wherein:
the mobile station comprises
a storage unit configured to establish a correspondence between an identifier for a downlink Layer-1 control channel associated with a downlink data channel and a frequency block number for an uplink Layer-1 control channel and to store the identifier and the frequency block number;
a physical layer parameter determining unit configured to determine a physical channel parameter including the frequency block number for the uplink Layer-1 control channel based on the identifier;
an uplink Layer-1 control channel generating unit configured to generate the uplink Layer-1 control channel used for transmitting a result of decoding data on the data channel based on the determined physical channel parameter; and
a transmitting unit configured to transmit control information on the generated uplink Layer-1 control channel; and
the base station comprises
a storage unit configured to establish a correspondence between the identifier for the downlink Layer-1 control channel associated with the downlink data channel and the frequency block number for the uplink Layer-1 control channel and to store the identifier and the frequency block number;
a reception quality measuring unit configured to measure reception quality on an uplink propagation path based on a signal transmitted from the mobile station;
a downlink Layer-1 control channel generating unit configured to select the physical channel parameter including the frequency block number for the uplink Layer-1 control channel based on the reception quality on the uplink propagation path and generate the downlink Layer-1 control channel associated with the downlink data channel corresponding to the frequency block number; and
a transmitting unit configured to transmit control information on the generated downlink Layer-1 control channel.

2. The mobile communication system as claimed in claim 1, wherein: the physical layer parameter determining unit determines the physical channel parameter for the uplink Layer-1 control channel to which a retransmission request feedback signal is mapped corresponding to the downlink Layer-1 control channel associated with the downlink data channel.

3. The mobile communication system as claimed in claim 1, wherein:
the storage unit establishes a correspondence between a channel number for the downlink Layer-1 control channel associated with the downlink data channel and the frequency block number for the uplink Layer-1 control channel and stores the channel number and the frequency block number,
the physical layer parameter determining unit determines the frequency block number for the uplink Layer-1 control channel to which a retransmission request feedback signal is mapped corresponding to the downlink Layer-1 control channel associated with the downlink data channel, and
the downlink Layer-1 control channel generating unit selects the frequency block number for the uplink Layer-1 control channel based on the reception quality on the uplink propagation path and generates the downlink Layer-1 control channel associated with the downlink data channel corresponding to the frequency block number.

4. The mobile communication system as claimed in claim 1, wherein: the physical layer parameter determining unit determines the physical channel parameter corresponding to the identifier by means of a predetermined function.

5. A mobile station, comprising:
a storage unit configured to establish a correspondence between an identifier for a downlink Layer-1 control channel associated with a downlink data channel and a frequency block number for an uplink Layer-1 control channel and to store the identifier and the frequency block number;
a physical layer parameter determining unit configured to determine a physical channel parameter including the frequency block number for the uplink Layer-1 control channel based on the identifier;
an uplink Layer-1 control channel generating unit configured to generate the uplink Layer-1 control channel used for transmitting a result of decoding data on the data channel based on the determined physical channel parameter; and
a transmitting unit configured to transmit control information on the generated uplink Layer-1 control channel.

6. A base station, comprising:
a storage unit configured to establish a correspondence between an identifier for a downlink Layer-1 control channel associated with a downlink data channel and a frequency block number for an uplink Layer-1 control channel and to store the identifier and the frequency block number;
a reception quality measuring unit configured to measure reception quality on an uplink propagation path based on a signal transmitted from a mobile station;
a downlink Layer-1 control channel generating unit configured to select a physical channel parameter including the frequency block number for the uplink Layer-1 control channel based on the reception quality on the uplink propagation path and generate the downlink Layer-1 control channel associated with the downlink data channel corresponding to the frequency block number; and
a transmitting unit configured to transmit control information on the generated downlink Layer-1 control channel.

7. A control channel allocating method, comprising the steps of:
a) measuring, by a base station, reception quality on an uplink propagation path based on a signal transmitted from a mobile station;

b) selecting, by the base station, a physical channel parameter including a frequency block number for an uplink Layer-1 control channel based on the reception quality on the uplink propagation path and generating a downlink Layer-1 control channel associated with a downlink data channel corresponding to the frequency block number;
c) transmitting by the base station, control information on the generated downlink Layer-1 control channel;
d) receiving, by the mobile station, the control information on the downlink Layer-1 control channel associated with the downlink data channel;
e) determining, by the mobile station, the physical channel parameter including the frequency block number for the uplink Layer-1 control channel corresponding to an identifier for the downlink Layer-1 control channel associated with the downlink data channel based on a predetermined correspondence between the identifier and the frequency block number;
f) generating, by the mobile station, the uplink Layer-1 control channel used for transmitting a result of decoding data on the data channel based on the determined physical channel parameter; and
g) transmitting, by the mobile station, control information on the generated uplink Layer-1 control channel.

8. The control channel allocating method as claimed in claim 7, wherein: the step of e) comprises determining the physical channel parameter for the uplink Layer-1 control channel to which a retransmission request feedback signal is mapped corresponding to the downlink Layer-1 control channel associated with the downlink data channel.

9. The control channel allocating method as claimed in claim 7, wherein:
the step of e) comprises determining the frequency block number for the uplink Layer-1 control channel to which a retransmission request feedback signal is mapped corresponding to the downlink Layer-1 control channel associated with the downlink data channel, and
the step of b) comprises selecting the frequency block number for the uplink Layer-1 control channel based on the reception quality on the uplink propagation path and generating the downlink Layer-1 control channel associated with the downlink data channel corresponding to the frequency block number.

10. The control channel allocating method as claimed in claim 7, wherein:
the step of e) comprises determining the physical channel parameter corresponding to the identifier by means of a predetermined function.

* * * * *